(12) United States Patent
Moran et al.

(10) Patent No.: US 8,335,860 B2
(45) Date of Patent: Dec. 18, 2012

(54) FILTERING APPLICATION SERVICES

(75) Inventors: Timothy L. Moran, Corinth, TX (US); Sreenivas Addagatla, Irving, TX (US)

(73) Assignee: Nokia Corporation, Espoo (FI)

( * ) Notice: Subject to any disclaimer, the term of this patent is extended or adjusted under 35 U.S.C. 154(b) by 1344 days.

(21) Appl. No.: 10/322,788

(22) Filed: Dec. 19, 2002

(65) Prior Publication Data
US 2004/0122977 A1 Jun. 24, 2004

(51) Int. Cl.
*G06F 15/16* (2006.01)
(52) U.S. Cl. ........................................ 709/246; 709/203
(58) Field of Classification Search .................. 709/246, 709/203, 223, 224, 225, 229, 232
See application file for complete search history.

(56) References Cited

U.S. PATENT DOCUMENTS

| | | | |
|---|---|---|---|
| 5,958,006 A | 9/1999 | Eggleston et al. | |
| 6,237,031 B1* | 5/2001 | Knauerhase et al. | 709/221 |
| 6,604,143 B1* | 8/2003 | Nagar et al. | 709/229 |
| 7,020,721 B1* | 3/2006 | Levenberg | 709/246 |
| 2001/0034224 A1* | 10/2001 | McDowell et al. | 455/412 |
| 2002/0078153 A1* | 6/2002 | Chung et al. | 709/204 |
| 2002/0083127 A1* | 6/2002 | Agrawal | 709/203 |
| 2002/0120687 A1* | 8/2002 | Diacakis et al. | 709/204 |
| 2002/0126701 A1 | 9/2002 | Requena | |
| 2002/0133627 A1* | 9/2002 | Maes et al. | 709/246 |
| 2003/0008661 A1* | 1/2003 | Joyce et al. | 455/456 |
| 2003/0051055 A1* | 3/2003 | Parrella et al. | 709/246 |
| 2003/0174814 A1* | 9/2003 | Diacakis | 379/80 |
| 2004/0098491 A1* | 5/2004 | Costa-Requena et al. | 709/229 |
| 2006/0090005 A1* | 4/2006 | Wu | 709/238 |
| 2006/0090006 A1* | 4/2006 | Wu | 709/238 |
| 2007/0266176 A1* | 11/2007 | Wu | 709/242 |

FOREIGN PATENT DOCUMENTS

| | | |
|---|---|---|
| JP | 11-134264 | 5/1999 |
| JP | 11-232126 A | 6/1999 |
| WO | 99/66385 A2 | 12/1999 |
| WO | WO9966385 * | 12/1999 |
| WO | 02093959 A1 | 11/2002 |
| WO | WO 02/093595 A2 | 11/2002 |
| WO | WO 02/093959 A1 | 11/2002 |

OTHER PUBLICATIONS

S. Coulombe, P. Pessi, J. Costa-Requena, Nokia: "Requirements for Message Adaptation in the Context of SIP Instant Messaging and Presence Applications," Network Working Group —Internet Draft, Oct. 1, 2002, pp. 1-7, XP002274012.
Donovan Steve: "IMPS—Instant Messaging and Presence Using SIP," White Paper Dynamicsoft, Sep. 13, 2000, pp. 1-16, XP002959658.
Chinese office action, Application No. 2003801092373, Feb. 27, 2009, pp. 1-7, China.
European Office action for corresponding EP App. No. 03 780 442. 4-2413 dated Jun. 16, 2010, pp. 1-5.
European Office action for corresponding EP App. No. 03 780 442. 4-2413 dated Sep. 25, 2006, pp.
Chinese Office action for corresponding CN app. No. 200380109237.3 dated Aug. 20, 2010, pp. 1-11.

(Continued)

*Primary Examiner* — Barbara Burgess
(74) *Attorney, Agent, or Firm* — Ditthavong Mori & Steiner, P.C.

(57) ABSTRACT

There is disclosed a method and apparatus for filtering information provided from an application server to an application client, comprising applying filtering rules at an intermediary element in a communication path between said application server and said application client.

26 Claims, 3 Drawing Sheets

OTHER PUBLICATIONS

Japanese Office action for corresponding JP Application No. 2008-275292 dated Jan. 31, 2011, pp. 1-5.
Chinese Office action for corresponding CN app. No. 200380109237.3 dated Jun. 2, 2011, pp. 1-8.
Indian Office Action for related Indian Patent Application No. 3248/CHENP/2007 dated Jan. 24, 2012, pp. 1-2.
Japanese Office Action for related Japanese Patent Application No. 2008-275292 dated Jan. 23, 2012, pp. 1-5.

* cited by examiner

FILTERING APPLICATION SERVICES

FIELD OF THE INVENTION

The present invention relates to the accessing of information associated with application services, particularly but not exclusively to presence services in mobile communication systems.

BACKGROUND OF THE INVENTION

The provision of presence services is set to become an important feature of third generation IMS (IP Multimedia Core Network Subsystem) mobile communication systems. A presence service utilises a server to accept information, store it, and distribute it. The information stored may for example relate to a user's willingness to communicate or their capability for communication, or it may be general information relating to the users, or graphics data. The service offers users the opportunity to receive status information relating to one or more other user(s). Presence services also allow applications and services to be provided to a user of mobile or fixed equipment in dependence on the position or location of the user or equipment. Presence services also facilitate instant messaging (IM).

In mobile communication systems it is important to minimise the traffic over the radio interface. In known proposals for implementing presence services, when a user subscribes to presence services the presence server transmits all possible presence information for the user over the radio interface to the user's terminal. Thus all the presence data that is available is first provided to the user, and after that the user optionally selects the data of interest. This procedure places an unnecessary burden on the radio interface in a wireless environment, as unnecessary data traffic which is not needed by the user is transmitted over the radio interface. It is also possible that the receiving terminal may not be able to store and handle all the presence data which is transmitted to it by the presence server.

In current known proposals, all of the presence data is transmitted to the user terminal for "learning" purposes, i.e. so that the user can select what information is of interest based on knowledge of what information is available.

A further known proposal relates specifically to the presence and instant messaging architecture. The proposal is to utilise the SUBSCRIBE message, which is a SIP (session initiation protocol) message, for a presence client to specify that it wishes to receive notification of events occurring at an application server or known to the application server. In the case of a presence server, the event may be that a presence entity (known as a presentity) has become available, for example, for instant messaging.

The conditions under which a client is notified of an event are defined by the presence service and controlled solely by the application server. In addition, however, a client may cancel their own subscription. Typically presence applications specify that a client is notified whenever a status changes.

It has been proposed that a client may specify their own notification rules for their subscription. For example, the rules may be specified in the body of the SUBSCRIBE request message, using a formal description language such as SOAP (Simple Object Access Protocol) or XML (extended mark-up language). Upon receipt of the subscription, the application server, such as a presence server, validates the notification rules and applies them to the subscription. When the client-specified rules are enabled, an appropriate notification is sent to the client. The effect of the rules is thus to enable a client to specify the conditions as to when it should be notified and what content should be delivered (e.g. only attributes of interest)

The application of such a client-defined filter applied at the application server has the advantage of reducing communications from the application server to the client, and thereby minimising bandwidth load on the communication link from the application server to the client and processing (interrupt handling) at the subscriber unit.

However, such an arrangement potentially has a drawback in that it relies upon a client which has the capability to define a set of filter rules, and an application server which has the ability to interpret and apply such rules. If either the client or the application server does not have the appropriate capability, then the filter arrangement cannot work. Event notification applications, such as presence servers, may not have the functionality to include the necessary capabilities, especially legacy applications which may require undesired upgrades. Alternatively, a service provider may not wish to provide such capability. The support of filtering to every application server subscribed to by a client requesting such filtering is onerous. Thus the usefulness of such filtering is severely limited.

It is an object of the present invention to provide an improved method for providing access to application services, which addresses one or all of the above-stated problems.

SUMMARY OF THE INVENTION

According to the present invention there is provided a method of filtering information provided from an application server to an application client, comprising applying filtering rules at an intermediary element in a communication path between said application server and said application client.

The step of applying the filtering rules at the intermediary element may be independent of both said application server and said application client.

The step of applying the filtering rules at the intermediary element may be independent of one of said application server or said application client, but not the other. The step of applying the filtering rules at the intermediary element may be independent of said application server. The filtering rules may be determined by the application client. The intermediary element may receive the filtering rules in a request for application services from the application client. The intermediary element may remove the filtering rules and forwards the request to the application server. The intermediary element may receive a reply from the application server and applies the filtering rules to the reply, and forwards a filtered reply to the application client. The step of applying filtering rules at the intermediary element may be independent of said application client. The filtering rules may be determined by the intermediary element. The filtering rules may be dependent upon characteristics associated with the application client. The filtering rules may be dependent upon characteristics of a network of which the intermediary element forms a part. The characteristics may be agreed between the network and the application client. The intermediary element may receive a request for application services from the application client. Responsive to such request the intermediary element may determine the filtering rules. The intermediary element may forward the request and the filtering rules to the application server. The intermediary element may receive a filtered response from the application server. The intermediary element may forward the filtered response to the application client. The intermediary element may forward the request without the filtering rules to the application server. The intermediary element may receive a response from the application server. The intermediary element may apply the filtering rules to the response. The intermediary element may forward a filtered response to the application client. The method may further comprise the step of retrieving the filtering rule information. The filtering rule information may include data type definitions or schema information. The intermediary element may invoke or validate the rules.

According to a further aspect of the present invention there is provided a device for filtering information provided from an application server to an application client, the device being connected in a communication path between the application server and the application client, the device being adapted to apply filtering rules.

The filtering rules may be applied independent of both said application server and said application client.

The filtering rules may be independent of one of said application server or said application client, but not the other.

The filtering rules may be independent of said application server. Said filtering rules may be determined by the application client. The device may be further adapted to receive the filtering rules in a request for application services from the application client. The device may be further adapted to remove the filtering rules and forward the request to the application server. The device may be further adapted to receive a reply from the application server and apply the filtering rules to the reply, and forward a filtered reply to the application client. The filtering rules may be independent of said application client. The device may further be adapted to determine filtering rules. The filtering rules may be dependent upon characteristics associated with the application client. The filtering rules may be dependent upon characteristics of a network of which the device forms a part. The characteristics may be agreed between the network and the application client. The device may be further adapted to receive a request for application services from the application client. The device according may be further adapted, responsive to such request, to determine the filtering rules. The device may be further adapted to forward the request and the filtering rules to the application server. The device may be further adapted to receive a filtered response from the application server.

The device may be further adapted to forward the filtered response to the application client. The device may be further adapted to forward the request without the filtering rules to the application server. The device may be further adapted to receive a response from the application server. The device may be further adapted to apply the filtering rules to the response. The device may be further adapted to forward a filtered response to the application client. The device may be further adapted to retrieve the filtering rule information.

The filtering rule information may include data type definitions or schema information. The device may be further adapted to invoke or validates the rules.

The device may comprise a server. The device may comprise an element of a communication network. The element may be a proxy server.

The present invention advantageously provides for the application of rules in a session initiation protocol subscription message that may be intercepted by a server, such as a proxy call state control function, and the function of a filtering engine performed without requiring the application server and/or the application client knowing.

BRIEF DESCRIPTION OF THE DRAWINGS

The present invention is described herein by way of reference to the accompanying figures in which.

DESCRIPTION OF PREFERRED EMBODIMENTS

The present invention is described herein with reference to particular exemplary embodiments. The skilled person will appreciate that the invention is not limited in its scope to the embodiments described herein. In particular the present invention is described herein with reference to an implementation in a wireless communication system where the user is associated with a mobile terminal. The invention is not limited to applications in mobile communication networks, or to the users of mobile terminals. The invention may equally be used in fixed line communication networks and in fixed terminals.

In particular, the invention is described in relation to the provision of a presence service in a 3G IMS mobile communications network. However, the invention is not limited to such a service or such a network.

Figure 1:
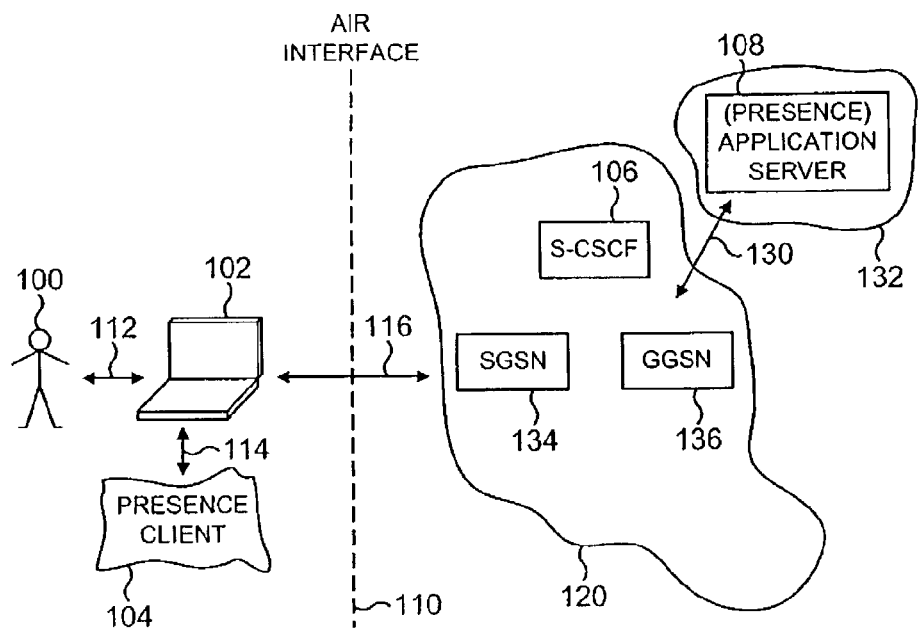
FIG. 1 illustrates an example network architecture for implementing access to application services.

Referring to FIG. 1, there is illustrated the main elements of a mobile communication system required for the purposes of describing preferred embodiments of the present invention. Only the elements are shown which are required for the purposes of illustrating the embodiments of the present invention. The general structure of communication networks implementing application services such as presence services is known in the art. One skilled in the art will appreciate the essential elements required in order to implement known presence services.

In particular FIG. 1 describes an example implementation of a network arrangement for providing presence services. It should be noted that many aspects of presence services, including the use of terminology, are not yet standardised. The use of terminology in the following description should be considered with this in mind; the important aspect of the following description being an understanding of the functional aspects of the elements described.

In presence services, a user can access presence services in a different number of ways. A first type of user is known as a presentity. The presentity is an owner of presence information. The presence information owned by the presentity is stored, for example, on a presence server, and distributed to other users. A second type of user is known as a watcher. A watcher receives presence information from a presence service, i.e. presence information associated with a presentity. Subscriber is a term which may also be used generally to refer to a user that is subscribing to the presence information of a presentity The preferred embodiment of the present invention is concerned with accessing presence information, and therefore from the perspective of describing an embodiment of the present invention the user should be considered to be a user accessing presence information rather than a user creating presence information. As such, in the following description, the user may be referred to as a watcher, consistent with terminology currently preferred in the art.

In FIG. 1, a user acting as a watcher and identified by reference numeral 100, accesses presence services hosted by an application server—specifically a presence server. The bi-directional arrow 112 represents the user 100 interface with a user terminal 102. The user inputs information at the terminal 102 by way of a keyboard (for example), and receives information from the terminal 102 by way of the terminal's display (for example). The terminal 102 may be any number of types of devices, such as a mobile telephone, a personal data assistant, a laptop computer, or a desktop computer.

A presence client generally illustrated by reference numeral 104 in FIG. 1 represents a client application running on the terminal 102. The bi-directional line 114 represents the interaction of the presence client 104 with the terminal 102. The presence client 104 is software running on the terminal 102, which enables the user 100 to access presence services.

Thus, the user (watcher) 100 interacts with the presence client application 104 in the terminal 102 in order to access presence information. It should be noted that in practice the combination of the user 100, the presence client 104 and the terminal 102 may be considered to be the watcher. Furthermore, the presence client 104 is preferably software running on the terminal 102, which the terminal may have downloaded, and the terminal 102 and presence client 104 may be considered to be a single entity.

It will be appreciated, from the above description, that at other times the user 100 may be acting as a presentity.

Furthermore, for the purposes of accessing presence information associated with a particular application service, the user 100 is required to have a subscription to that service, and may also be referred to, therefore, as a subscriber.

In the embodiment of FIG. 1, the terminal 102 interfaces with a mobile communication network generally illustrated by reference numeral 120. The terminal interacts with the mobile communications network 120 over the air interface, generally represented by the dashed line 110. The bi-directional arrow 116 represents communications over the air interface 110 between the terminal 102 and the mobile communications network 120.

For the purposes of understanding the present invention, the mobile communications network 120 is shown to include a serving call state control function (S-CSCF) 106, a serving GPRS support node (SGSN) 134 and a gateway GPRS support node (GGSN) 136. As stated above, the structure and implementation of such a network is well-known, and only the minimum elements required to describe an embodiment of the present invention are shown in FIG. 1. The network 120 may, for example, further include a proxy call state control function (P-CSCF).

Also shown in FIG. 1 is an external IP network 132 which includes a presence application server 108.

As is known in the art, the SGSN and the GGSN are used to establish a call session between the user equipment 102 and the external IP network 132. Once a call session is established the S-CSCF 106 supports a call made to the IP network through the mobile network 120 by the terminal 102.

The mobile communications network 120 may, for example, be a UMTS network or other network supporting access to presence services. It should also be noted that the present invention is not limited in its applicability to the provision of application services over a radio interface. The application services may be provided over a fixed line communications network.

The presence application server 108 stores or hosts presence information associated with various presentities. Access to the presence information may be public or restricted. Restrictions may be based on level of subscription, or authorisation identities provided by the presentity.

Figure 2:
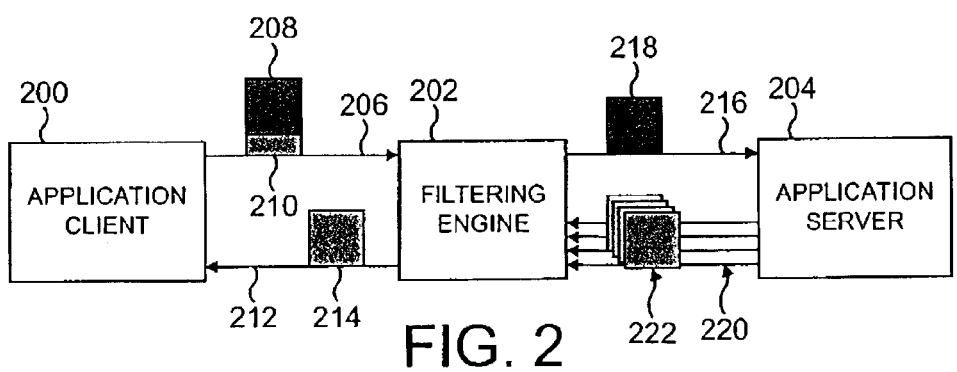
FIG. 2 illustrates an example architecture for implementing a filtering engine in accordance with a first embodiment of the present invention.
Figure 4:
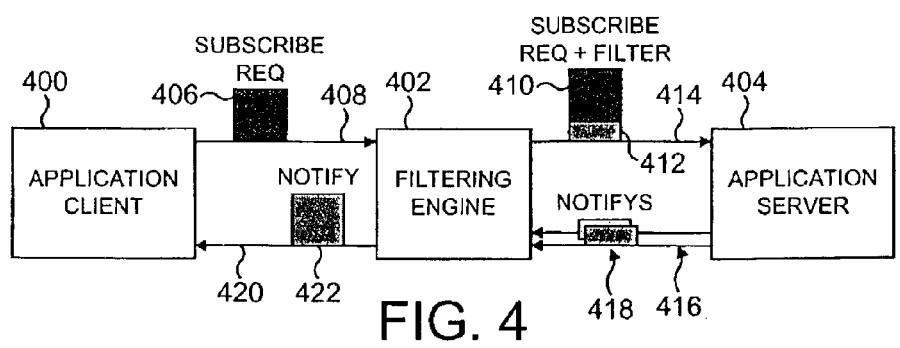
FIG. 4 illustrates an example architecture for implementing a filtering engine in accordance with a second embodiment of the present invention.

In accordance with the present invention, an intermediary element between the user equipment 102 and the presence application server 108 is adapted to control and/or apply a filter to the information accessed from the presence application server. The identification of the intermediary element may be implementation dependent, and is not limited to a particular element. A discussion of a preferred element for implementing the functionality is given herein below. In the first instance, however, for the purposes of explaining two preferred embodiments of the invention, it is assumed that the S-CSCF 106 implements the filter functionality. For the purposes of the following description, the element which implements the filter is referred as a filtering engine. Two preferred embodiments of the present invention are now described with reference to FIGS. 2 and 4. In FIGS. 2 and 4, the term application client is generally used to refer to user equipment being used by a user to access an application. The term application server is used to refer to a server supporting or providing the application service. The term filtering engine, as discussed herein above, refers to an intermediary element between the application client and the application server. Various elements are required between the application client and the application server in order to effect communications, as one skilled in the art will appreciate. The filtering engine may be applied in any one of these elements. Other ones of the various elements, other than that needed to implement the filtering engine, are not shown in FIGS. 2 and 4.

Referring to FIG. 2, a first embodiment of the present invention is shown. FIG. 2 shows an application client 200, an application server 204, and a filtering engine 202. In the first embodiment, it is assumed that the application client supports filtering, but the application server does not support filtering.

In accordance with known techniques, the application client transmits a subscribe message to the filtering engine 202 on line 206. The subscribe message comprises a standard subscribe message 208, and a filtering message 210. The transmission of such a message by the application client is known in the art, and therefore the generation of such a message in the application client 2002 is not described herein.

The filtering engine 202 receives the message on line 206, which is a combined subscribe and filter message. As discussed further herein below with reference to FIG. 3, the filtering engine accepts and stores the filter description in the filter part of the message, and forwards only the subscribe part of the message 218 on a line 216 to the application server 204.

The application server thus receives on line 216 a standard subscribe message 218, which it recognises and processes in accordance with conventional techniques. The application server 204 transmits a plurality of notification messages 222 on lines 220 to the filtering engine 202. The operation of the application server is consistent with conventional techniques familiar to one skilled in the art, and is not described in any further detail herein.

Figure 3:
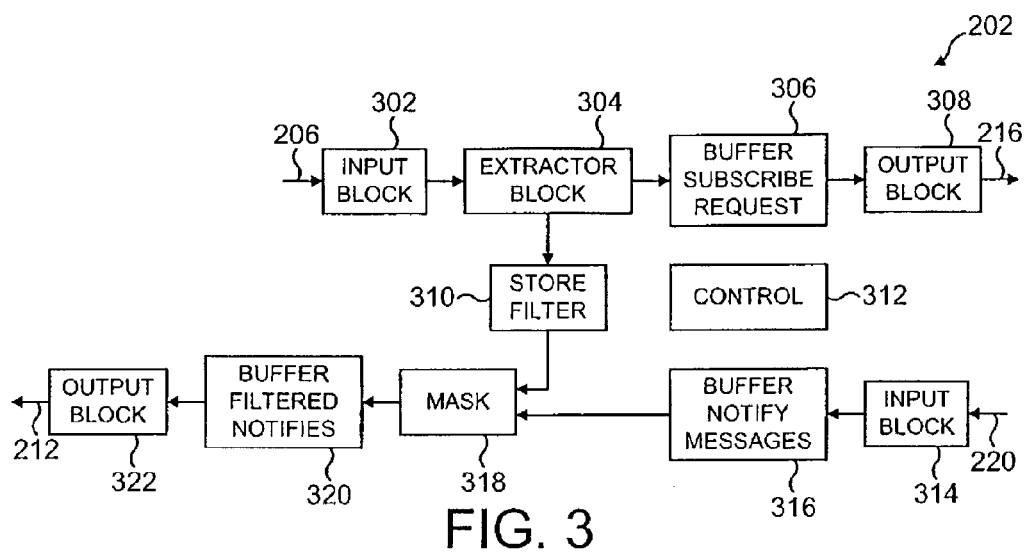
FIG. 3 illustrates an example schematic implementation of the filtering engine of FIG. 2.

The filtering engine 202 receives the notifications 222 on line 220, and as described further with reference to FIG. 3 applies the stored client filters to filter the notifications 222. The filtered notifications 214 are then transmitted on lines 212 to the application client 200. Thus the application client receives notifications filtered according to the client filter specifications.

Referring to FIG. 3, there is illustrated a possible implementation of a filtering engine in accordance with the embodiment of the present invention described in FIG. 2. It will be appreciated by one skilled in the art that the filtering engine may be implemented in a variety of different ways, and the implementation of FIG. 3 is provided for illustrative purposes only.

The subscribe request and filter message on line 206 from the application client is received at an input block 302, which forwards such message to an extractor block 304. The extractor block extracts the filter part of the message and stores it in a filter store 310, together with information such as the identity of the subscriber. The subscriber request part of the message is forwarded to a subscribe request buffer 306 from the extractor block 304. The buffered subscribe request messages are then provided to an output block 308 for transmission on line 216 toward the application server 204.

The notifications 222 on lines 220 from the application server are received at an input block 314, which forwards such messages to a notify messages buffer 316. The buffered notify messages are applied to a first input of a mask 318. The second input of the mask 318 is provided by the filter store 310, which applies the filter for the application client to which the notify messages are destined. The mask 318 thus provides on an output thereof only those messages which are consistent with the rules applied from the filter store 310. The outputs of the mask 318 are buffered in filtered notifications buffer 320, before being provided to an output block 322 for transmission on line 212 toward the application client.

The filtering engine 202 further includes a control block 312 for controlling the various elements thereof.

In extracting and storing the client filter from the message received on line 206, the filtering engine may need to obtain public application information such as DTDs (data type definitions) or XML Schemas—or other such definitions—for the filter from, for example, the application URL, which definitions may be referenced in the client-defined rules. XML could be used to specify the rules. The filtering engine may use XML name space declarations in the filter description XML file to obtain DTDs for filtering rules and the application DTDs.

Thus, in the embodiment of FIG. 2, the filtering engine looks for rules contained in the body (or elsewhere) of a user equipment initiated subscribe request, and enables a filtering process on behalf of the client which is not visible to the application server. The rule is removed from the request before forwarding the request to the application server. Notifications from the application server are then filtered by the IMS subsystem filtering engine, such as the filtering engine 202 in the S-CSCF, applying the rules.

Referring to FIG. 4, a second embodiment of the present invention is shown. FIG. 4 shows an application client 400, an application server 404, and a filtering engine 402. In the second embodiment, it is assumed that the application server supports filtering, but the application client does not support filtering, at least not directly.

In accordance with known techniques, the application client transmits a subscribe message to the filtering engine 402 on line 408. The subscribe message comprises a standard subscribe message 406. The transmission of such a message by the application client is well-known in the art.

The filtering engine 402 receives the subscribe message on line 206. As discussed further herein below with reference to FIG. 5, the filtering engine generates a filter for the application client. The filter may be generated based on, for example, client constraints obtained from the client profile information in the subscribe message. In another alternative, the filter may be generated based on network imposed constraints. The filter may further be based on both such alternatives.

The filtering engine then sends a modified subscribe message to the application server on a line 414, which includes as one part 410 the original subscribe message, and as another part 412 the filtering engine generated filter.

The application server 404 thus receives on line 414 a subscribe message with a filter, which it recognises and processes in accordance with conventional techniques. The subscribe message with filter is known from conventional techniques where it is constructed by the application client and forward directly to the application server.

The application server 404 applies the filtering rules and compiles notifications for the application client in dependence on such rules. The application server 404 then transmits a plurality of notification messages 418 on lines 416 to the filtering engine 402. The notification messages 418 are fewer than would be sent without any filtering. The operation of the application server 404 is consistent with conventional techniques familiar to one skilled in the art, and is not described in any further detail herein.

The filtering engine receives the notifications 418 on lines 416, and simply transmits the notifications 422 on lines 420 to the application client 400. Thus the application client receives notifications filtered according to the filtering engine specifications.

Thus in the embodiment of FIG. 4, the filtering engine may intercept subscribe requests from the application client, and install filtering rules appropriate, for example, to the level of quality of service (QoS) support of the serving network. Such QoS level may be determined during a PDP context activation or modification between the user equipment and the serving network. The thus enhanced subscribe request is then forwarded to the application server, which may accept or reject the request. If rejected, the application server preferably sends a fail response. The filtering engine may intercept such response, and remove the installed filtering. Alternatively, the failure response may be forwarded to the mobile. As the filter, in this embodiment, is not created by the mobile, then if a failure response is sent to the mobile then the mobile must have some knowledge of the reasons for failure. For example, the filter may be somehow known to the user, or it may be understood by the mobile that a filter was created based on the mobile's profile.

Figure 5:
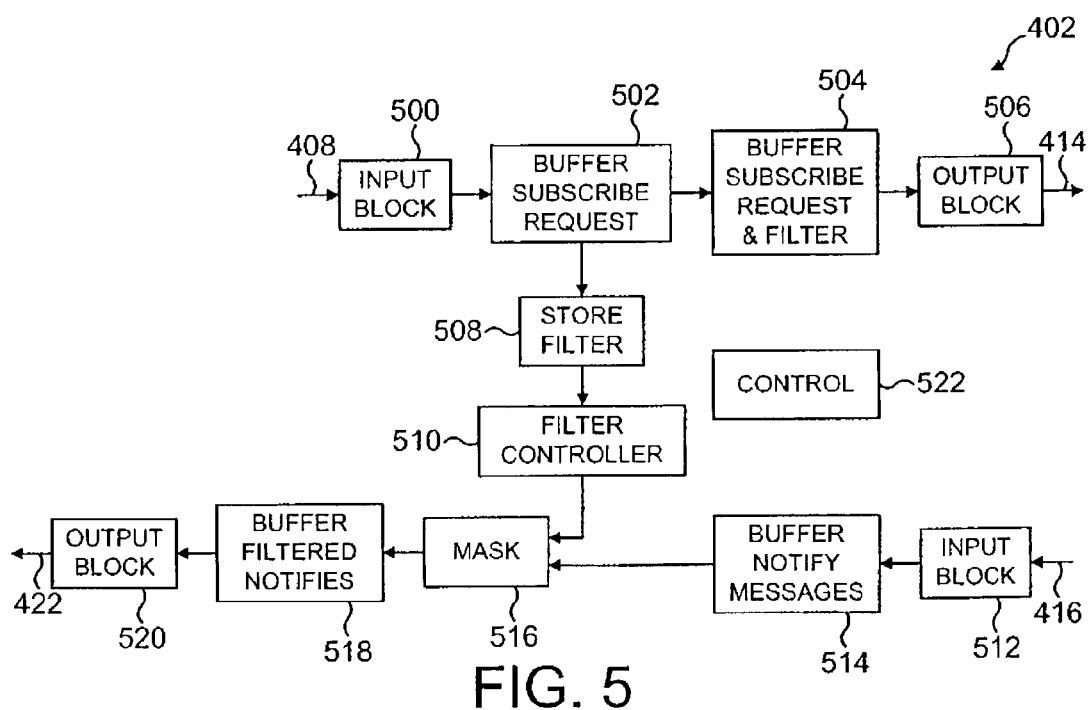
FIG. 5 illustrates an example schematic implementation of the filtering engine of FIG. 2

Referring to FIG. 5, there is illustrated a possible implementation of a filtering engine in accordance with the embodiment of the present invention described in FIG. 4. It will be appreciated by one skilled in the art that the filtering engine may be implemented in a variety of different ways, and the implementation of FIG. 5 is provided for illustrative purposes only.

The subscribe request message on line 408 from the application client is received at an input block 500, which forwards such a message to a subscribe request buffer 502. The filtering engine 402 includes a filter controller 510 which controls a filter store 508. The filter controller determines any filter to be applied to the subscribe request based on, for example, client identity, and stores such filter in filter store 508. The filter store 508 provides an input to the subscriber request buffer 502, and as such the filter rules are added to the subscribe request messages. The thus modified subscribe and filter request messages are buffered in a buffer 504. The buffered subscribe and filter request messages are then provided to an output block 506 for transmission on line 414 toward the application server 404.

The notifications 418 on lines 416 from the application server are received at an input block 512, which forwards such messages to a notify messages buffer 514. The buffered notified messages are applied to a first input of a mask 516. The second input of the mask 516 is provided by the filter controller 510, which retrieves the appropriate filter from the filter store 508, and applies the filter for the application client to which the notification messages are destined. The mask 516 thus provides on an output thereof only those messages which are consistent with the rules applied from the filter store 508. The outputs of the mask 516 are buffered in filtered notifications buffer 518, before being provided to an output block 520 for transmission on line 422 toward the application client.

The filtering engine 402 further includes a control block 522 for controlling the various elements thereof.

It will be appreciated by one skilled in the art that the two embodiments described herein above with reference to FIGS. 2 and 4 may be combined in various ways to further enhance and modify the filtering. For instance, in the example of FIG. 4 the client defined filtering of FIG. 2 could be further introduced. Further, in the example of FIG. 4 additional filtering could be applied in the filtering engine 402 to further reduces the amount of notifications. One skilled in the art will appreciate that various aspects of the described embodiments may be freely combined.

The embodiment of FIG. 2 may be named a filter interceptor, and the embodiment of FIG. 4 may be named a filter installer.

The present invention improves scalability and interoperability compared to prior art techniques, since the application server and the application client need not be aware of the addition of filtering rules and rule based notifications. Costly radio frequency and device resources are saved, especially for wireless devices, since the frequency and content of notifications are reduced.

As described hereinabove, in one preferred embodiment the filtering engine is implemented in the serving call state control function (S-CSCF). However the filtering engine may be implemented in any network element between the application client and the application server. Other proxy servers may for example be used, such as a proxy call state control function (P-CSCF).

The technique is particularly advantageous in communications between an application client and an application server which utilise session initiation protocol (SIP). The invention may utilise XML in the body of a message to identify filtering rules. The filtering rules may also be included in commands in a query such as a SOAP protocol.

In the above-described embodiments, there is described a scenario where a single application server resides in a network external to the core network of a communication system. The invention is not limited to such a scenario.

The invention advantageously applies also in scenarios where multiple application clients reside on a single application server. In such a scenario, a single filtering engine may be located in the application server in front of the multiple application clients, or at a proxy in front of the application server. Advantageously, the filtering engine of the present invention may thus still be used in conjunction with legacy clients.

The invention also applies regardless of where the application server is located. Whilst the described embodiments show the application server residing in an external network, the invention is also advantageous where the application server resides in the core network, for example with the SGSN or GGSN. A wireless operator may thus use existing application services in conjunction with a filtering engine in the core network. Alternatively, a network operator may purchase application servers without having custom modifications to the application clients to filter NOTIFY responses.

Thus, the integration of a filtering engine in accordance with the present invention need not be a costly implementations in legacy networks.

The present invention has been described herein by way of reference to particular, non-limiting examples. One skilled in the art will appreciate that modifications and variations are possible to the embodiments described wherein. The scope of protection is defined by the appended claims.

The invention claimed is:

1. A method comprising facilitating a processing of and/or processing (1) data and/or (2) information and/or (3) at least one signal, the (1) data and/or (2) information and/or (3) at least one signal based, at least in part, on the following:

a request from an application client for presence information, wherein said request is received at an intermediary element in a communication path between an application server and an application client, said presence information comprising notification of one or more events occurring at the application server or known to the application server, and said request comprises one or more filtering rules;

removal of the one or more filtering rules at the intermediary element;

at least one determination to forward the request to the application server without the one or more filtering rules;

upon receiving, at the intermediary element, a response from the application server, application of the one or more filtering rules to the response; and at least one determination to forward the filtered response to the application client.

2. The method according to claim 1, wherein said filtering rules are determined by the application client.

3. The method according to claim 1, wherein the (1) data and/or (2) information and/or (3) at least one signal are further based, at least in part, on the following:

retrieval of filtering rule information.

4. The method according to claim 3, wherein the filtering rule information includes data type definitions or schema information.

5. The method according to claim 3, wherein the intermediary element invokes or validates the one or more rules.

6. An apparatus comprising:

at least one processor; and at least one memory including computer program code, the at least one memory and the computer program code configured to, with the at least one processor, cause the apparatus to perform at least the following, receive a request from an application client for presence information, said request comprising one or more filtering rules; wherein the apparatus is configured to be connected in a communication path between an application server and the application client, and the presence information comprises notification of one or more events occurring at the application server or known to the application server;

extract the one or more filtering rules from the request;

determine to send the request to the application server without the one or more filtering rules;

receive a response at the apparatus from the application server;

apply the one or more filtering rules to said response; and determine to forward the filtered response to the application client.

7. The apparatus according to claim 6, wherein said filtering rules are determined by the application client.

8. The apparatus according to claim 6, wherein the apparatus is the device further configured to retrieve filtering rule information.

9. The apparatus according to claim 8, wherein the filtering rule information includes data type definitions or schema information.

10. The apparatus according to claim 8, wherein the apparatus is further configured to invoke or validate the one or more filtering rules.

11. The apparatus according to claim 6, wherein the apparatus further comprises a server.

12. The apparatus according to claim 6, wherein the apparatus further comprises an element of a communication network.

13. The apparatus according to claim 12, wherein the element is a proxy server.

14. A method, comprising facilitating a processing of and/or processing (1) data and/or (2) information and/or (3) at least one signal, the (1) data and/or (2) information and/or (3) at least one signal based, at least in part, on the following:
    a request from a subscriber user of an application client for presence information, wherein said request is received at an intermediary element in a communication path between an application server and an application client, and said presence information comprising notification of one or more events occurring at the application server or known to the application server about a user different from the subscriber user of the application client;
    generation of one or more filtering rules at the intermediary element for filtering said presence information;
    at least one determination to forward the request and the one or more filtering rules to the application server;
    a filtered response from the application server, wherein said filtered response is received at the intermediary element; and
    at least one determination to forward the filtered response to the application client.

15. The method according to claim 14, wherein the filtering rules are determined by the intermediary element.

16. The method according to claim 15, wherein the filtering rules are dependent upon characteristics associated with the application client.

17. The method according to claim 15, wherein the filtering rules are dependent upon characteristics of a network of which the intermediary element forms a part.

18. The method according to claim 17, wherein the characteristics are agreed between the network and the application client.

19. An apparatus comprising:
    at least one processor; and
    at least one memory including computer program code,
    the at least one memory and the computer program code configured to, with the at least one processor, cause the apparatus to perform at least the following,
        receive a request from a subscriber user of an application client for presence information, wherein the apparatus is configured to be connected in a communication path between an application server and the application client, and the presence information comprising notification of one or more events occurring at the application server or known to the application server about a user different from the subscriber user of the application client;
        generate one or more filtering rules for filtering said presence information;
        determine to send the request and the one or more filtering rules to the application server;
        receive a filtered response from the application server; and
        determine to send the filtered response to the application client.

20. The apparatus according to claim 19, wherein the apparatus is further configured to determine the filtering rules.

21. The apparatus according to claim 20, wherein the filtering rules are dependent upon characteristics associated with the application client.

22. The apparatus according to claim 21, wherein the filtering rules are dependent upon characteristics of a network of which the apparatus forms a part.

23. The apparatus according to claim 22, wherein the characteristics are agreed between the network and the application client.

24. A method comprising facilitating a processing of and/or processing (1) data and/or (2) information and/or (3) at least one signal, the (1) data and/or (2) information and/or (3) at least one signal based, at least in part, on the following:
    a request from a subscriber user of an application client for presence information, wherein said request is received at an intermediary element in a communication path between an application server and an application client, and said presence information comprising notification of one or more events occurring at the application server or known to the application server about a user different from the subscriber user of the application client;
    generation of one or more filtering rules at the intermediary element for filtering said presence information;
    at least one determination to forward the request to the application server;
    a response from the application server, wherein said response is received at the intermediary element;
    application of the one or more filtering rules to the response; and
    at least one determination to forward the filtered response to the application client.

25. An apparatus comprising:
    at least one processor; and
    at least one memory including computer program code,
    the at least one memory and the computer program code configured to, with the at least one processor, cause the apparatus to perform at least the following,
        receive a request from a subscriber user of an application client for presence information, wherein the apparatus is configured to be connected in a communication path between an application server and the application client, and the presence information comprises notification of one or more events occurring at the application server or known to the application server about a user different from the subscriber user of the application client;
        generate one or more filtering rules for filtering said presence information;
        determine to send the request to the application server;
        receive a response from the application server;
        apply the one or more filtering rules to said response; and
        determine to forward the filtered response to the application client.

26. An apparatus comprising:
at least one processor; and
at least one memory including computer program code,
the at least one memory and the computer program code configured to, with the at least one processor, cause the apparatus to perform at least the following,
determine to send a request from a subscriber user of the apparatus for presence information to an intermediary element, wherein the intermediary element is configured to be connected in a communication path between the apparatus and an application server, and the presence information comprises notification of one or more events occurring at the application server or known to the application server about a user different from the subscriber user of the apparatus;
receive the presence information from the intermediary element, wherein the presence information is filtered according to one or more filtering rules.

* * * * *